C. C. STUTZ.
MANUFACTURE OF GLASS ARTICLES.
APPLICATION FILED FEB. 8, 1912.

1,037,364.

Patented Sept. 3, 1912.

7 SHEETS—SHEET 1.

C. C. STUTZ.
MANUFACTURE OF GLASS ARTICLES.
APPLICATION FILED FEB. 8, 1912.

1,037,364.

Patented Sept. 3, 1912.
7 SHEETS—SHEET 2.

WITNESSES:
J. Herbert Bradley
Thomas Joyce

INVENTOR
Charles C. Stutz
by Dennis B. Heath
Atty

C. C. STUTZ.
MANUFACTURE OF GLASS ARTICLES.
APPLICATION FILED FEB. 8, 1912.

1,037,364.

Patented Sept. 3, 1912.

7 SHEETS—SHEET 3.

WITNESSES:
J. Herbert Bradley.
Thomas Joyce

INVENTOR
Charles C. Stutz
by Dawnin S Wolcott
Atty

C. C. STUTZ.
MANUFACTURE OF GLASS ARTICLES.
APPLICATION FILED FEB. 8, 1912.

1,037,364.

Patented Sept. 3, 1912.

7 SHEETS—SHEET 4.

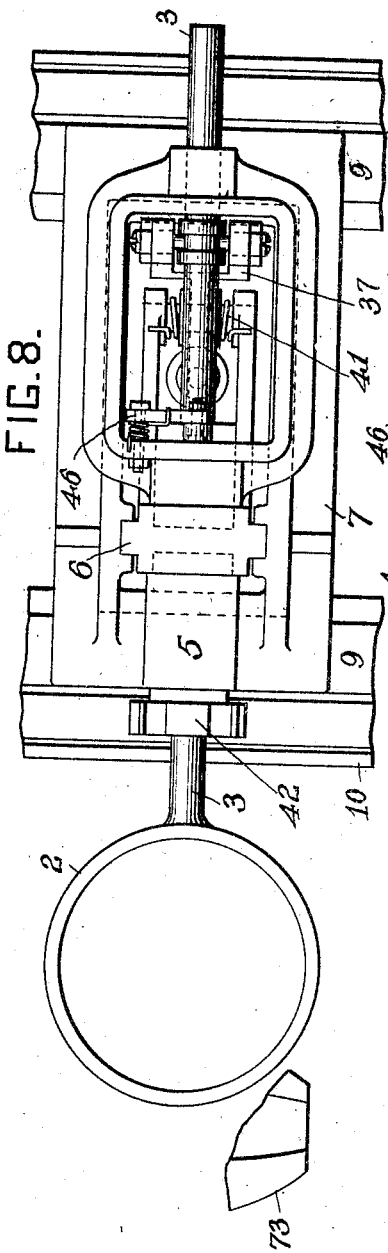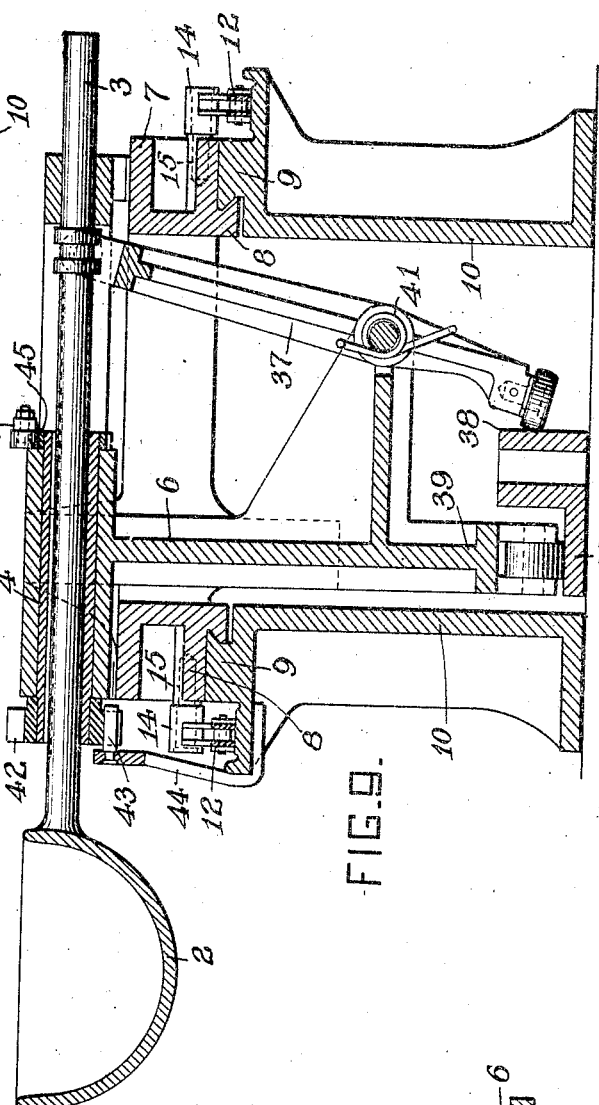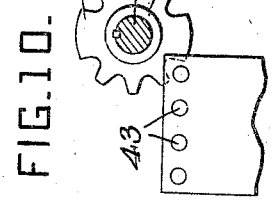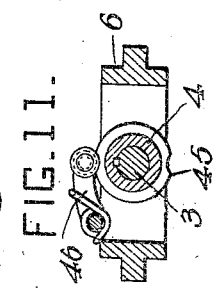

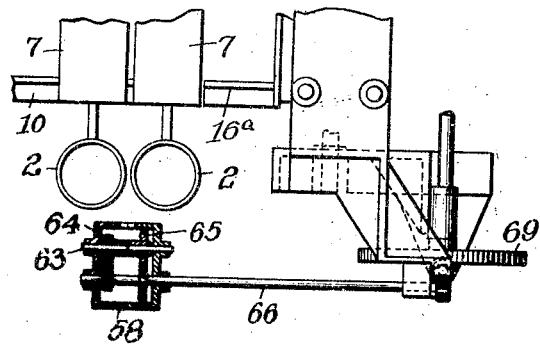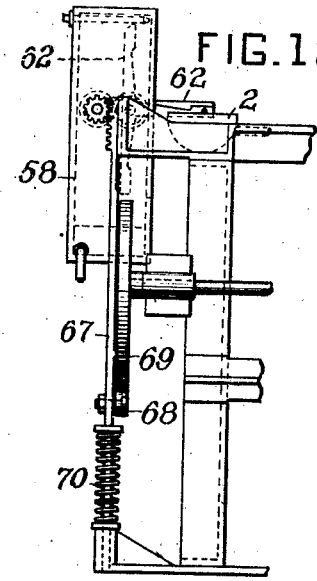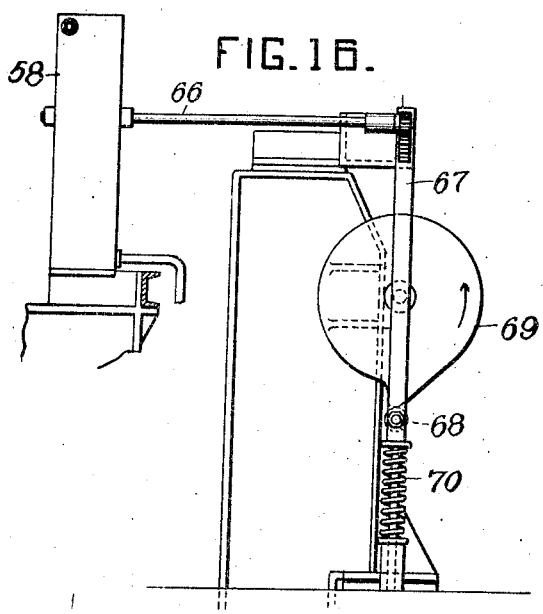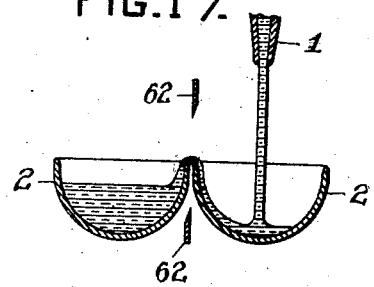

C. C. STUTZ.
MANUFACTURE OF GLASS ARTICLES.
APPLICATION FILED FEB. 8, 1912.
1,037,364.
Patented Sept. 3, 1912.
7 SHEETS—SHEET 7.
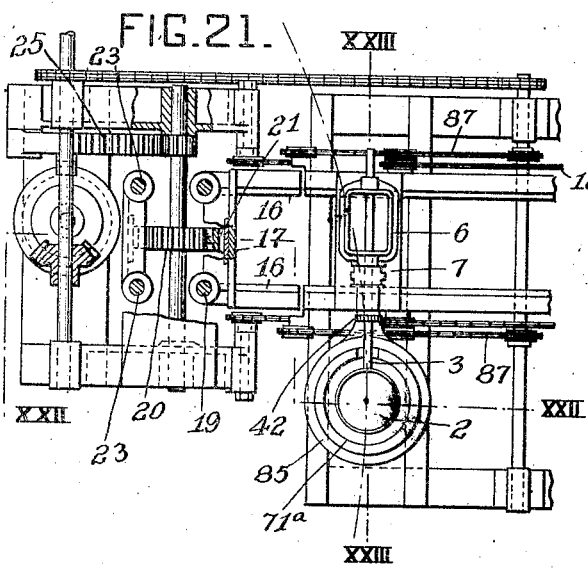
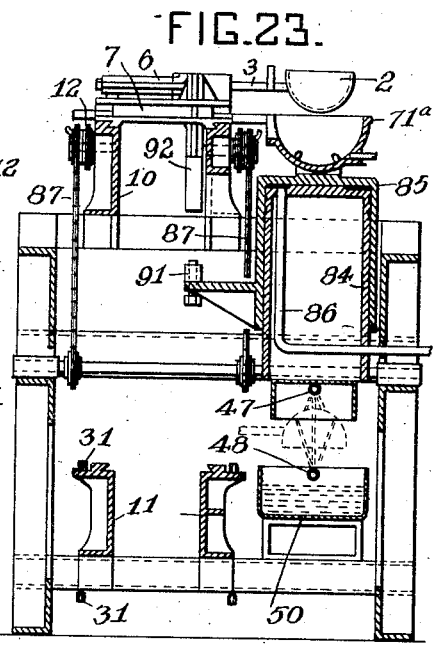
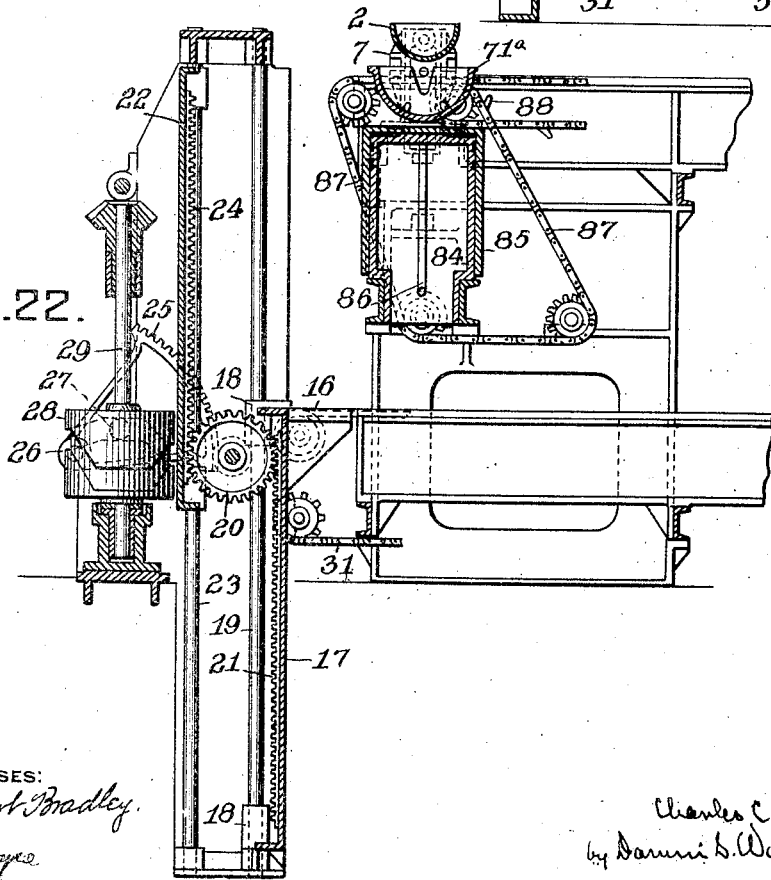

UNITED STATES PATENT OFFICE.

CHARLES C. STUTZ, OF NORWOOD, OHIO.

MANUFACTURE OF GLASS ARTICLES.

1,037,364.

Specification of Letters Patent. Patented Sept. 3, 1912.

Application filed February 8, 1912. Serial No. 676,465.

*To all whom it may concern:*

Be it known that I, CHARLES C. STUTZ, residing at Norwood, in the county of Hamilton and State of Ohio, a citizen of the United States, have invented or discovered certain new and useful Improvements in the Manufacture of Glass Articles, of which improvements the following is a specification.

The invention described herein relates to certain improvements in the manufacture of glass articles and particularly to the transfer of the molten glass from the furnace or melting pot to the shaping mold.

The invention has for its object the employment of a series of glass gathering tools which are moved in succession from the glass receptacle to a series of molds which are brought in succession to the charging point, from which the ladles are returned to the point of supply and the molds are moved through a circuit during which the glass is partially or wholly shaped.

The invention is hereinafter more fully described and claimed.

Figure 1:
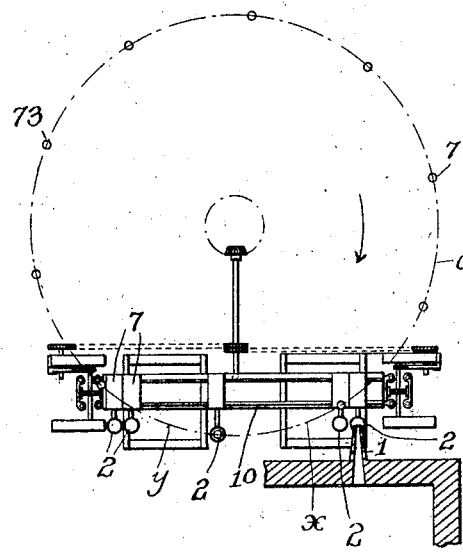
Figure 2:
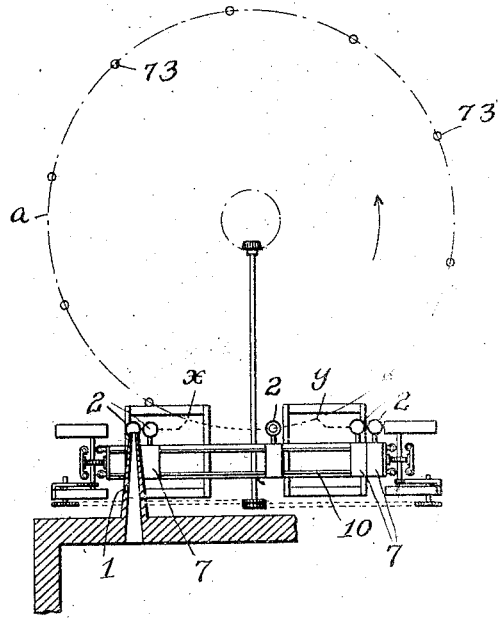
Figure 3:
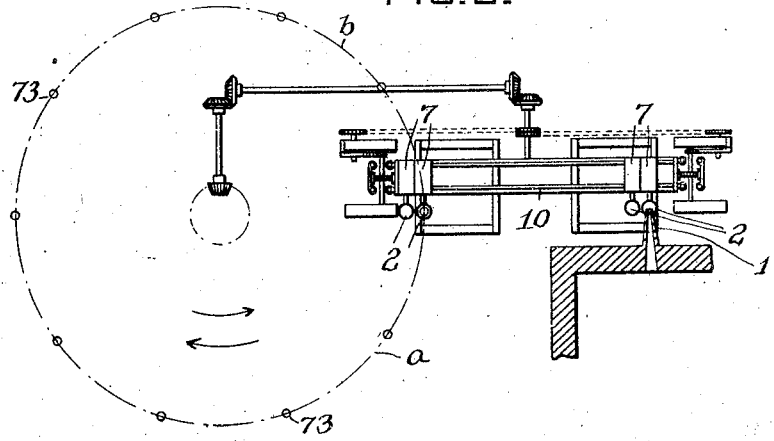
Figure 4:
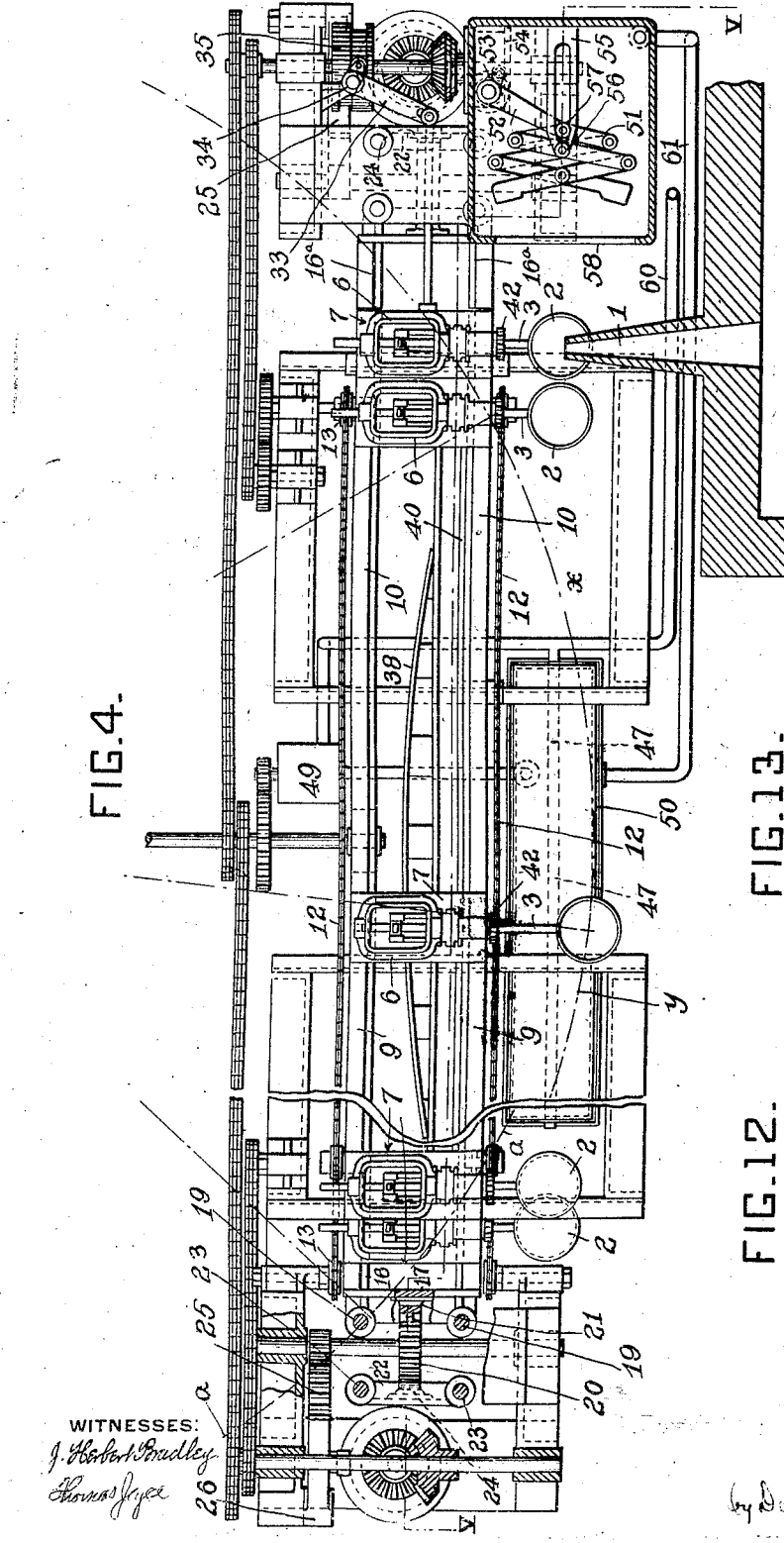
Figure 13:
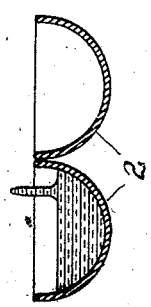
Figure 12:
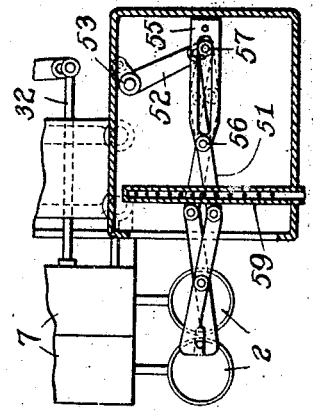
Figure 5:
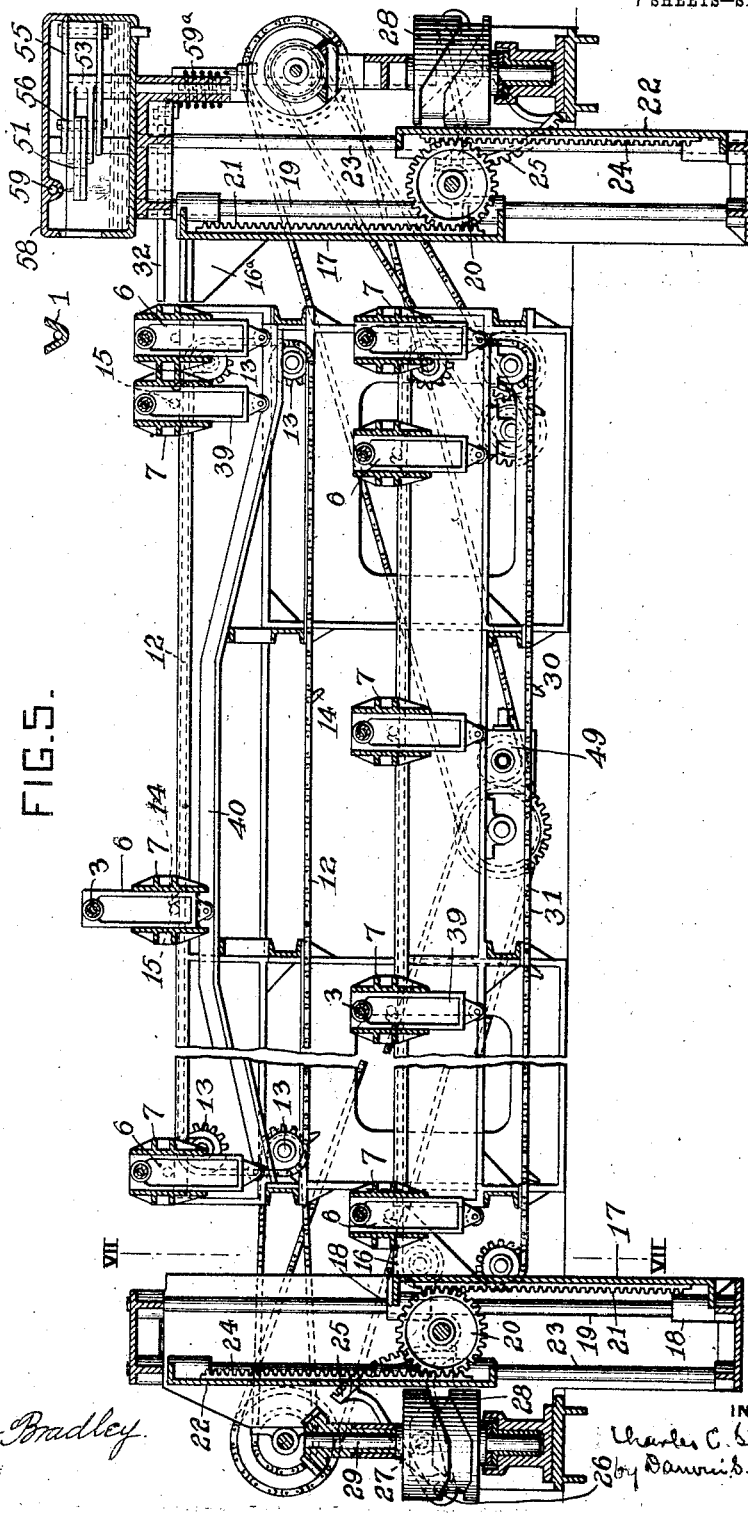
Figure 6:
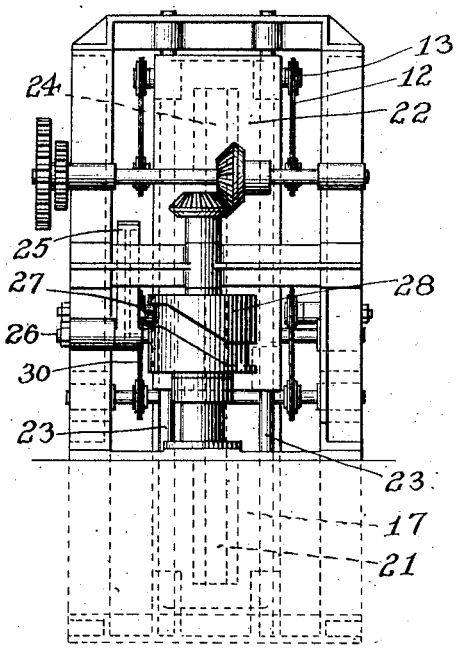
Figure 7:
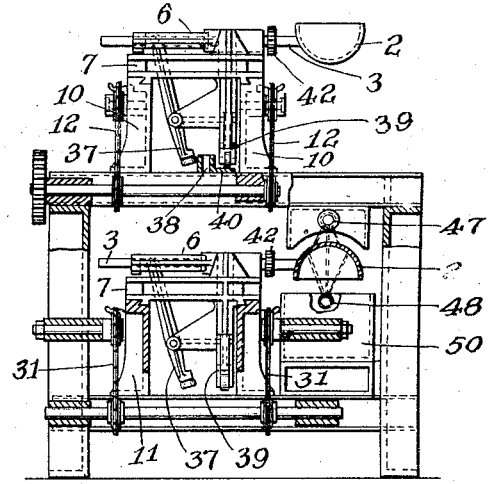
Figure 18:
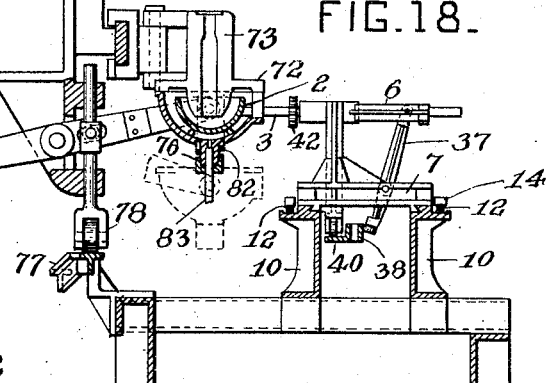
Figure 19:
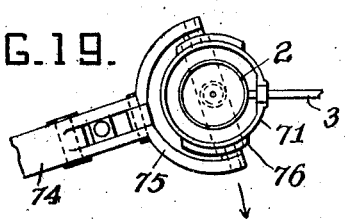
Figure 20:
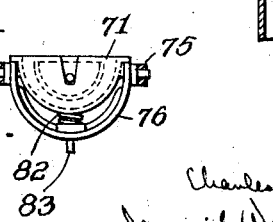

In the accompanying drawings forming a part of this specification; Figures 1, 2 and 3 are in the nature of diagrammatic views illustrating different relations of the glass mechanisms to mold carrying mechanisms; Fig. 4 is a top plan view of the mechanism shown in Fig. 1 the continuously operating shifting mold means or table being indicated diagrammatically; Fig. 5 is a sectional elevation on a plane indicated by the line V—V Fig. 4; Fig. 6 is an end elevation of the mechanism shown in Figs. 4 and 5; Fig. 7 is a transverse section on a plane indicated by the line VII—VII Fig. 5; Figs. 8 and 9 are plan and sectional elevations of the carrier of the gathering tool showing the guides therefor; Figs. 10 and 11 are detail views showing a form of mechanism for turning the tool and locking the same when turned; Fig. 12 is a plan view of a portion of the machine shown in Fig. 4 showing the cutting mechanism; Fig. 13 is a diagrammatic view illustrating the charging of the ladles and the severing of the glass between the ladle and filling spout; Figs. 14, 15 and 16 are plan, side and end elevations showing a modification of the shearing means and its operating mechanism; Fig. 17 is a diagrammatic view illustrating the operation of the mechanism shown in Figs. 14, 15 and 16; Fig. 18 is a sectional elevation illustrating a means for inclosing the ladle when in charging relation to a mold; Fig. 19 is a detail view illustrating the manner of supporting the inclosing bowl; Fig. 20 is an end view of the construction shown in Fig. 19; Fig. 21 is a top plan of a portion of the ladle moving mechanism illustrating a modification of the means employed for moving the ladle vertically to operative relation to the mold where the mold carrier is moved intermittingly; Figs. 22 and 23 are sectional elevations on planes indicated respectively by the lines XXII—XXII and XXIII—XXIII Fig. 21.

In the practice of the invention described herein a series of gathering tools carrying a suitable quantity of glass in a plastic condition, are moved in succession away from the glass supply and brought into proper relation for the transfer of glass to a series of molds also moved in succession. The molds in any desired number may be moved in any suitable manner and by any desired form or construction of mechanism. Nor is the invention set forth herein limited as regards its broad features to any particular manner or means for segregating quantities of molten glass from the supply and charging the transfer tool, nor to any particular manner or means for charging the mold from the transfer tool.

While the invention will be described in connection with means for charging the mold by atmospheric pressure or pressure higher than atmospheric pressure substantially in the manner described and shown in Letters Patent No. 759,742 dated May 10, 1904, No. 766,768 dated August 2, 1904, Nos. 1,007,156 and 1,007,252 dated October 31, 1911 respectively it will be understood that other means known in the art may be employed. And further, the mechanism for shaping the glass when delivered thereto may be any suitable construction such for example as that shown and described in Letters Patent No. 766,768 above referred to or that shown and described in an application Serial No. 633,851 filed December 4th, 1911.

In the practice of my invention as set forth herein a continuous flow of glass from a furnace or other suitable source of supply is maintained through the spout 1 such flow being regulated by any suitable means in accordance with the capacity of the shaping mechanism employed. The glass is received by ladles 2, which are moved under the spout, and when filled shifted into such relation to molds as to permit of the glass being transferred to the latter. After a suitable quantity has been discharged into the mold the ladles are emptied and returned to filling position under the spout. During such return it is preferred that the ladles should be cooled by spraying or otherwise. In the present form of my invention the ladles are carried by shafts or rods 3, which are passed through sleeves 4, so keyed or otherwise connected to the rods that the latter may move longitudinally through the sleeves but are caused to turn therewith as hereinafter described. The sleeves are rotatably mounted in bearings 5 in the vertically movable slides 6 which are carried by slides 7 provided with guiding portions 8 adapted to engage guides 9 in the feeding frame 10 and similar guides in the return frame 11. The slides 7 are moved along the frame 10 by any suitable means preferably by endless chains 12 passing around sprocket wheels 13, one of which is driven as clearly shown in Fig. 5. These chains are provided with suitable means for engaging the slides as the hooks 14, which are so shaped as to catch on pins 15, and at the proper point in the traverse of the slide 7 to automatically disengage therefrom. In the construction shown the disengagement of the hooks from the pins is due to the downward travel of the chains as the latter pass around the upper left hand sprocket wheel in Fig. 5. After the chains have been released from one of the slides 7, the latter remains on the frame 10 adjacent to the end thereof until the next succeeding slide is moved along by the chains. This second slide pushes the first one onto arms 16 in line with the guides 9 of the frame 10. These arms are carried by the lowering carriage 17 which is provided with sleeves 18 mounted on the guide rods 19. The carriage may be reciprocated vertically by any suitable means, as for example by a toothed wheel 20 engaging a rack 21 on the carriage. It is preferred to counterbalance the carriage, and to that end a weight 22 is mounted on guide rods 23 and is provided with a rack 24 also engaging the toothed wheel 20 on the side diametrically opposite the rack 21. The back and forth rotation of the toothed wheel is preferably effected by a toothed section 25 secured to a shaft 26 and engaging a pinion on the shaft carrying the toothed wheel 20. The shaft 26 is provided with a rocker arm 27 having a projection engaging a cam groove 28 on the vertical shaft 29.

A slide 7 having been shifted as stated onto the lowering carriage 17, the latter is lowered until the arms 16 are in alinement with guide ways 9ª of the return frame 11. When in this position hooks 30 on the endless chain 31, which is driven in a direction the reverse of the chain 12, engage the pins 15 on the slide 7 and move the latter along the frame 11 to a point adjacent to the opposite end thereof. When the slide has reached this position the hooks 30 move down away from the pins 15 and the slide remains stationary at the end of the frame 11 until pushed therefrom by the next succeeding slide of the series onto arms 16ª of an elevating mechanism similar in construction to the lowering mechanism hereinbefore described, but designed to carry the slides 7 and parts carried thereby to a position where they can be pushed into the guides 9 of the upper frame 10. This movement of the slides from the elevating mechanism onto the end of the frame 10 bring the ladles into receiving position under the spout 1, where they will remain receiving their charges of glass, until pushed farther along the frame by the next succeeding slides as the latter are pushed from the elevator onto the frame 10 and under the spout 1. By reference to Figs. 1, 2 and 3 it will be seen that the filling of the ladles is effected at one end of the frame 10, and that the transfer of the glass to the molds is effected either while the slides carrying the ladles are moved along the frame, as illustrated in Figs. 1 and 2 or after the slides have reached a point when the line of movement of the molds as indicated by the circle $b$ in Fig. 3 intersects the line of movement of the ladles. In the combination shown in Figs. 1 and 2 provision is made for causing the ladles, while moving between the points $x$ and $y$, to move through an arc of a circle $a$ corresponding to that described by the molds between the same points.

As hereinbefore stated the transfer of the glass from the ladles to the molds may be effected in any suitable way known in the art, but it is preferred to bring the ladles and molds into such relation to each other, that the glass will be forced into the mold by atmospheric pressure or by a higher pressure. As being much easier it is preferred to move the ladles to operative relation to the molds and to that end provision is made not only to move the ladles in a circular path so as to be in alinement vertically with the molds, but also to raise the ladles to submerge the open lower ends of the molds in the glass contained in the ladles. A convenient means for effecting these movements of the ladles is clearly shown in Figs. 4, 5, 7, 8 and 9. A lever 37 pivotally mounted on the vertically moving slide 6 has its upper end connected to the ladle rod 3, and its lower end bearing on a curved guide 38 between the sides of the frame, while the slide 7 carrying the slide 6 and the ladle is moved along the frame 10. The curvature of the guide 38 corresponds to that of the path of movement of the molds, so that while the lower end of the lever 37 is moving along the guide, the ladle itself will move in a circular path immediately below one of the molds. During this horizontal movement of the ladle the slide 6 is raised so as to submerge the end of the mold in the glass, by the movement of a downward extension 39 of the slide along a vertically curved guide plate 40. When the ladle has been raised either a vacuum may be created in the mold, or the surface of the glass outside of the mold subjected to pressure higher than atmospheric pressure, to cause the glass to flow up into the mold. Both of these methods of transferring metal from a receptacle to a mold are quite old and well known in the art. After the mold has been charged the ladle moves down from the mold, the glass in the latter, being severed from that remaining in the ladle, as fully shown and described in the patents hereinbefore referred. When lowered clear of the mold, the ladle is moved horizontally to its normal position relative to the slide 6 by a coiled spring 41 engaging the lever 37 and a portion of the slide 6 as shown in Figs. 8 and 9.

In order to discharge the surplus glass from the ladle, provision is made for inverting the same, as it is being moved from the frame 10 onto the arms 16 of the lowering mechanism as hereinbefore described. A suitable means for that purpose is shown in Figs. 9 and 10 and consists of a toothed disk 42 secured on the sleeve 4 in which the ladle rod is mounted and a series of pins 43 on the bracket 44. This bracket is so attached to the frame 10, that as the slide 7 is being pushed off the frame the teeth on the disk will engage the pins and be turned through an arc of 180° the ladle turning with disk. A similar construction is provided at a suitable point on the return or lower frame 11, to restore the ladle to receiving position after it has been sprayed, as hereinafter described.

In order to prevent any accidental turning of the ladle, a lock is provided to hold the same in its normal and inverted positions. A suitable construction for that purpose consists of a disk 45 secured on the sleeve 4 and provided with diametrically arranged notches for the reception of a spring actuated detent 46, as clearly shown in Figs. 9 and 11.

Provision should be made for cooling the ladles while moving along the lower or return frame 11. To this end, lines of pipe 47 and 48, suitably perforated, are arranged above and below the path of movement of the ladle during its return along frame 11, as shown in Figs. 7 and 23. These pipes are connected to the outlet of a pump 49 having its inlet connected to a trough 50, arranged to catch the cooling liquid sprayed against the ladle.

As indicated in Fig. 13, the stream of glass may be severed just as the charged ladle is being replaced by the next and preferably at the time the stream of glass is falling into the charged ladle near its edge. By severing the stream at such time, the portion below the shear being under tension will be pulled into the charged ladle, and the falling movement of portion above the shear, it being freed from the pull of the lower portion of the stream, will be arrested or slightly checked so that although the shears close and open instantaneously, the second ladle will be in position to receive the stream. A desirable construction for shearing the stream of glass consists of what is known as a lazy tongs 51, consisting of a series of bars pivoted together in pairs and having their ends pivoted to the ends of similarly pivoted pairs. The ends of the outer series are provided with cutting blades, while the ends of the inner series are pivotally connected to the end of an arm 52 on the shaft 53, which is oscillated in one direction by a cam 54 on shaft $24^a$. This cam operates to open the blades and to withdraw the lazy tongs; and during this movement the spring $59^a$ is placed under tension so as to operate the lazy tongs when it is desired to cut the stream of glass. One of the pivotal points, as 56 of the tongs, is supported by an arm 55, and the line of movement of the tongs is controlled by a slot in said arm, the pin 57 connecting the tongs to the operating arm 52 projecting into said slot. In this construction the shearing mechanism is normally inclosed in a box 58 and when operated the forward end moves out through a slot in the side of the box. As clearly shown in Figs. 5 and 12, a perforated passage 59 is provided in the box for cooling the blades of the shear mechanism, said passage being connected by a pipe 60 to the pump as is also the return pipe 61.

In lieu of cutting the stream of glass between the spout and ladle, the filled ladle may be shifted by the next, so that a stream of glass will be drawn over the edges of both ladles, as illustrated in Fig. 7. Before the filled ladle is moved by the chains 12, this connecting strand is severed by blades moving in a vertical plane passing between the two ladles. As shown in Figs. 14, 15, 16, the cutting blades are formed on the outer ends of arms 62, which have their inner ends independently mounted on a shaft 63, and connected respectively to pinions 64 and 65. One of these pinions, as 65, intermeshes directly with a pinion on the shaft 66, while the other is driven by another pinion on the same shaft, but through the medium of an idler, as shown in Figs. 14 and 15, so that the arms 62 will move simultaneously but in opposite directions. The shaft 66 is driven by a reciprocating rack 67 engaging a pinion on the shaft. The rack is provided with a projection 68, in the form of a roller, which is held in contact with the periphery of the cam 69 on the shaft 24ª by a spring 70. It will be observed that the cam is so constructed that the rack can be shifted quickly by the spring, which operates to impart the cutting movement to the arms 62.

When it is desired to employ pressure higher than that of the atmosphere to move the glass into the molds, a practically hermetic chamber should be formed around the ladle, after it has been moved into operative relation to the mold, as shown and described in Letters Patent #1,007,156. To this end, basins 71 adapted to inclose the ladles and form a practically tight joint with flanges 72 on the molds 73, are carried by the outer end of levers 74 pivotally mounted on the movable table carrying the mold, as shown in Fig. 18. It will be understood that an inclosing basin is provided for each mold carried by the table A, which is preferably of the construction shown and described in application Serial No. 663,851. The lever 74 is provided at its outer end with arms 75 having trunnions carrying the yoke 76 in which the basin is so supported as to be capable of turning when inclosing a ladle as shown in Figs. 19 and 20. The basin is raised to operative position by a guide plate 77 on the frame 10 through the medium of a rod 78 connected to the lever. In order to hold the basin tightly against the flange while pressure is admitted to shift the glass, it is preferred to employ a wedge block 79 mounted in guide ways on the table and adapted to be pushed in between such guide ways and the tail of the lever 74. As the movement of the wedge block is preferably effected by fluid pressure, the block is connected to the piston of a cylinder 80. The return or backward movement of the block may be effected by a spring 81 or other suitable means. By reference to Fig. 19, it will be seen that the lever 74 and the ladle rod 3 are at an angle to each other when the basins are first raised to inclose the ladle. As the table A and the ladle are constantly in motion and in the direction of the arrow in Fig. 19, the angle between the lever and ladle rod will increase until said parts are in line, and then will again assume an angular but reversed relation to each other. As the basin forms a tight joint with the ladle rod, provision is made as before stated for its partial rotation in its supporting yoke.
After the basin has been moved down out of engagement with the ladle rod, it is turned to normal or receptive position by a spring 82 surrounding a stud on the underside of the basin and having its ends connected to the latter and to the supporting yoke, as shown in Fig. 20. Fluid pressure is admitted to the basin when raised through a pipe 83, pressing up through the stud on the underside of the basin, as shown in Figs. 18 and 20.

While it is preferred to employ my improved glass transfer mechanism in combination with a series of continuously moving shaping mechanisms, it can be as readily employed in combination with a series of intermittently moving glass shaping mechanisms, as diagrammatically illustrated in Fig. 3. To adapt the glass transfer mechanism to supply intermittently moving molds, the means for shifting the ladle vertically and horizontally while moving along the supporting frame 10 are omitted, and the slide 7 carrying the ladle is moved by the chains 12 to the point where the paths of movement of the molds and the ladles intersect, as shown in Fig. 21, at which point the hooks 14 will become disengaged from the slide. At this point suitable means are arranged for lifting the ladle to operative relation to a mold, it being understood that the mold carrying table is so operated as to bring a mold to the same point and to maintain it there until a transfer of glass to the mold has been effected. While other means may be employed to lift the ladle, the construction shown in Figs. 21, 22, and 23 is well adapted for that purpose. This construction consists of a stationary plunger or piston 84 and a movable cylinder 85. This fluid pressure lifting means is arranged at the point of intersection of the mold and ladle movements, and as soon as said parts are in alinement vertically fluid pressure is admitted to the cylinder through pipe 86, thereby causing the upward movement of the cylinder and with it the ladle. When pressure above atmospheric is employed for causing the glass to flow up into the mold, an inclosing basin 71ª is secured to the upper end of the cylinder. While the slide 7 with a discharge ladle may be shifted from the frame 10 onto the lowering mechanism by the next succeeding slide as hereinbefore described, an endless chain 87, provided with hooks 88, may be employed for that purpose as shown in Figs. 21 and 22.

From the foregoing, it will be seen that my improved transfer mechanism can be adapted for use with slight and easily effected alterations, in connection with either a continuously or intermittently moving series of glass shaping devices; and further by other slight alterations the glass may be caused to flow from the ladles into the molds either by atmospheric pressure or by a higher pressure.

Several methods have been employed in automatic glass shaping mechanics for charging glass into molds; one where the lower ends of the molds are immersed in a body of glass which is in constant connection with the melting furnace; in a second method the glass is gathered by a suitable tool and transferred to the molds. In both of these methods the points of immersion of the molds, or the gathering of the glass, must be varied for each immersion or gather. A third method has been employed involving the flow of the glass from the furnace into a receptacle or mold. As heretofore practised, two difficulties were encountered in this method. If the glass is flowed directly into the mold it must be comparatively cool, and when in such condition was too stiff and unyielding to permit of the escape of air caught in the folds of glass as it fell into the mold. To overcome this difficulty, it has been run in a highly heated condition into a measuring or transfer vessel and there allowed to cool down to a shaping consistency, and the entire contents of such vessel were put into the mold either by tipping the vessel or through an opening in the bottom of the vessel. This method is objectionable as the outer skin is cooler than the interior portions and this lack of homogeneity will appear in the finished article.

In the practice of the invention described herein the glass can be run very hot into the ladle so that any inclosed air bubbles can escape, and sufficient time can be given for it to cool down to proper shaping plasticity before being charged in the mold. The ladle contains a larger quantity of glass than is required to form the article and is considerably larger than the end of the mold which, when immersed, will break through the surface skin and only the homogeneous interior portions will be forced into the mold by pressure on the surfaces outside of the mold. Thus in my improved method the complications arising from the necessity of constantly changing the point of immersion of the mold or gathering tool is avoided, and by forcing into the mold only the interior portions of the mass flowed into the ladle an entirely homogeneous article can be produced.

It is a characteristic of the invention set forth herein that at some point or some time in their cycles of movement there should be a coincidence of the paths of movement of the glass receptacles and molds. By the term coincidence is meant that, although the paths of movements of the receptacles and molds are in different planes, said parts are brought into such alinement or relation to each other that the glass may be caused to flow directly from the receptacles into the molds, and that without interfering with the movements of said parts.

I claim herein as my invention:

1. In a machine for the manufacture of glass articles, the combination of means for delivering a constant stream of glass, a series of independently movable receptacles, a series of glass shaping devices, means for moving the receptacles independently and in succession from position to receive glass from said stream to a discharge point, means for moving the shaping devices in succession to such point of discharge, and means for causing an upward movement of the glass from the receptacle into the shaping devices.

2. In a machine for the manufacture of glass articles, the combination of a series of receptacles, means for moving such receptacles in succession from a charging point to a discharging point, a series of glass shaping devices, means for moving such devices, portions of the paths of movement of the receptacles, and the shaping devices being coincident, and means for effecting the charging of the shaping devices while moving along such coincident paths.

3. In a machine for the manufacture of glass articles, the combination of a series of receptacles, means for moving such receptacles in succession from a charging to a discharging point, and means for returning the receptacles to the charging point but in planes different from that in which the receptacle moves from the charging to the discharging point.

4. In a machine for the manufacture of glass articles, the combination of a series of receptacles, means for moving the receptacles independently and in succession from a charging point to a discharging point, means for returning the receptacles to the charging point, and means for reversing the position of the receptacles during such return movement.

5. In a machine for the manufacture of glass articles, the combination of a series of receptacles, means for moving said receptacles in succession from a charging to a discharging point, a series of glass-shaping devices, means for moving such devices in succession in a direction intersecting the path of movement of the receptacle, means for causing the movements of the receptacle and shaping devices to coincide, and means for charging the shaping devices while coincident with the receptacles.

6. In a machine for the manufacture of glass articles, the combination of means for delivering a constant stream of glass, a series of receptacles, means for moving said receptacles in succession from such stream of glass, a series of shaping devices, means for moving such devices, a portion of such movement being synchronous with that of the receptacles, and means for charging the shaping devices from the receptacles during such synchronous movement.

7. In a machine for the manufacture of glass articles, the combination of means for delivering a stream of glass, a series of slides, ladles carried by said slides, constantly operating means for shifting said slides provided with means for automatically engaging and being disengaged from said slides, a series of glass shaping devices movable in a plane above and intersecting the plane of movement of the ladles, and means for shifting the ladles to position to deliver glass to the shaping devices when the latter have position in alinement with the ladles.

8. In a machine for the manufacture of glass articles, the combination of means for delivering glass, a series of horizontally movable slides, vertically movable slides carried by the latter, ladles carried by the vertical slides, endless chains provided with means for engaging the horizontal slides, and means for raising and lowering the vertical slides.

9. In a machine for the manufacture of glass articles, the combination of means for delivering glass, a series of horizontally movable slides, vertical slides mounted on the horizontal slides, ladles movably mounted on the vertical slides, endless chains provided with means for engaging the horizontal slides, means for raising and lowering the vertical slides, and means for shifting the ladles.

10. In a machine for the manufacture of glass articles, the combination of means for delivering a constant stream of glass, a series of receptacles, means for moving said receptacles away from such stream to a point of discharge, means for moving the receptacles in the opposite direction, means for transferring the receptacles from one moving means to the other, and means for returning the receptacles to the first shifting means.

11. In a machine for the manufacture of glass articles, the combination of a slide, a ladle carried by the slide, means for moving the slide from charging to discharging position, means for shifting the ladle to discharge position, means for turning the slide toward ladle charging position, a transfer mechanism for shifting the slide from one shifting means to the other, and means for moving the slide to its original line of movement.

12. In a machine for the manufacture of glass articles, the combination of a slide, a ladle carried by the slide, means for shifting the slide and adapted to be automatically connected to and disconnected from the slide, means for shifting the slide in the opposite direction and adapted to be automatically connected to and disconnected from the slide, and oppositely moving transfer means arranged at the ends of the forward and reverse movements for moving the slide from one shifting means to the other.

13. In a machine for the manufacture of glass articles, the combination of a slide, a ladle carried by the slide, two oppositely moving endless chains, provided with means for engaging the slide, two slide transferring means arranged to receive the slide from one of the chains and deliver it to the other at the ends of the travel of said chains.

14. In a machine for the manufacture of glass articles, the combination of a slide, a ladle carried by the slide, an endless chain for shifting the slide, a transfer means arranged to receive the slide, a second endless chain arranged to move the slide from the transfer and to shift the slide in the opposite direction, a transfer means arranged to receive the slide from the second chain and means for shifting the slide from the transfer to position to be engaged by the first chain.

In testimony whereof, I have hereunto set my hand.

CHARLES C. STUTZ.

Witnesses:
JOHN E. MOLONEY,
MYRTLE L. TOMER.